United States Patent [19]

Lahr

[11] 3,842,535

[45] Oct. 22, 1974

[54] METHOD OF GROWING PLANTS HYDROPONICALLY

[76] Inventor: Gerald J. Lahr, 2664 55th, San Diego, Calif. 92105

[22] Filed: Oct. 23, 1973

[21] Appl. No.: 408,329

Related U.S. Application Data

[63] Continuation of Ser. No. 271,140, July 12, 1972, abandoned.

[52] U.S. Cl.......................... 47/1.2, 239/201, 47/38
[51] Int. Cl............................................. A01q 31/02
[58] Field of Search.......... 47/1.2, 2.1, 34, 38, 38.1, 47/39, 18; 119/75; 239/200–208

[56] References Cited
UNITED STATES PATENTS

| | | | |
|---|---|---|---|
| 217,010 | 7/1879 | Judson et al............................ | 47/39 |
| 775,791 | 11/1904 | Austin............................ | 239/202 X |
| 1,826,072 | 10/1931 | Hamilton............................ | 239/201 |
| 3,018,057 | 1/1962 | Anderson............................ | 239/201 |
| 3,053,010 | 9/1962 | DeShazor............................ | 47/34 |
| 3,053,011 | 9/1962 | Silverman............................ | 47/38 |
| 3,613,309 | 10/1971 | Coburn............................ | 47/38 |
| 3,624,692 | 11/1971 | Lux............................ | 47/1.2 |
| 3,686,792 | 8/1972 | Barfield............................ | 47/39 |

*Primary Examiner*—Robert E. Bagwill
*Attorney, Agent, or Firm*—Richard K. Macneill

[57] ABSTRACT

The present invention relates to an improved and highly simplified system and apparatus for the hydroponic growing of plants in small removable containers, whereby a nutrient solution is applied to the bottom of the container. This system provides for optimum growth of plants, due to the use of freshly cleaned and sterilized gravel and containers for each planting. Replanting time between harvest and new planting is cut approximately 90 percent by removal of containers immediately after harvest and replacing with cleaned containers with 3 week old plants already growing from a propagation greenhouse. This method also allows for the rapid draining of the nutrient solution immediately after solution reaches desired height in container. This rapid draining creates a vacuum in the container which induces fresh air, high in oxygen content to the plant roots to induce plant growth.

5 Claims, 8 Drawing Figures

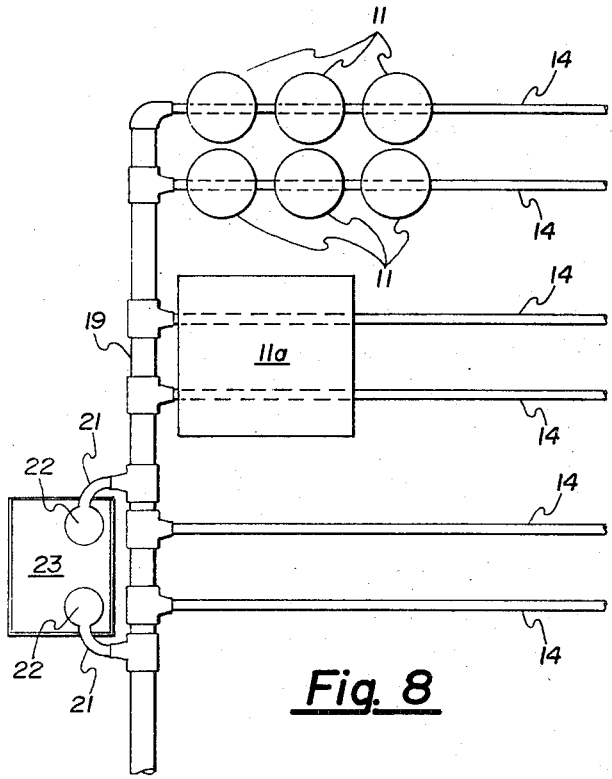
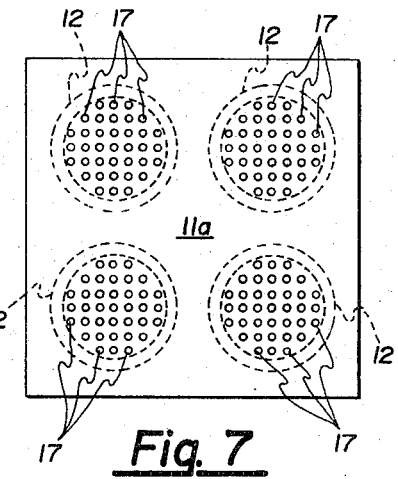
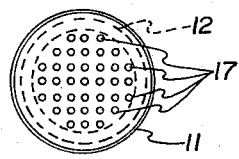
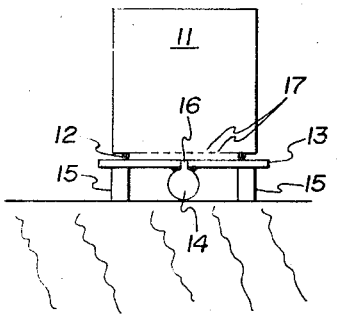
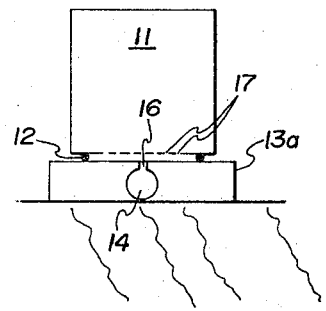
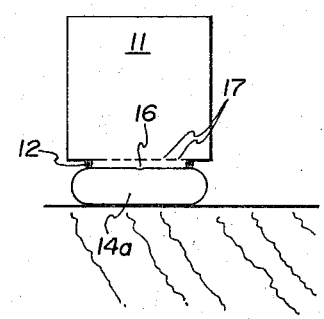
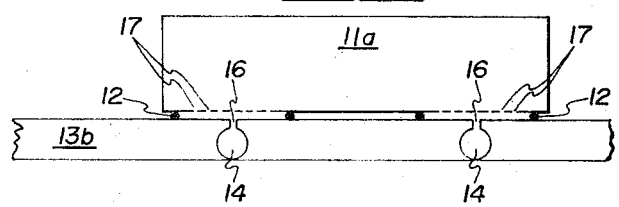
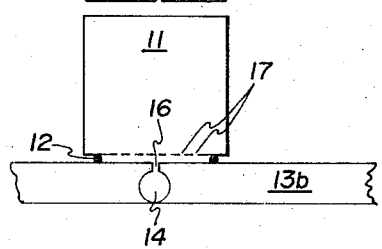

METHOD OF GROWING PLANTS HYDOPONICALLY

RELATED APPLICATIONS

This application is a continuation application for a co-pending application for U.S. Letters Patent for a method of growing plants hydroponically, filed July 12, 1972, Ser. No. 271,140 and now abandoned by Gerald J. Lahr.

RELATED PATENTS

The following patents were turned up by a patentability search of the prior art:

| Patentee | Date | Patent No. |
|---|---|---|
| Krueger | Nov. 10, 1936 | 2,060,735 |
| Lyons | Dec. 1, 1936 | 2,062,755 |
| Hansen | March 28, 1939 | 2,152,254 |
| Knipe | April 7, 1959 | 2,880,549 |
| Silverman | Sept. 11, 1962 | 3,053,011 |
| Dosedla | Feb. 28, 1967 | 3,305,968 |

BACKGROUND OF THE INVENTION

The use of hydroponic gardens is becoming increasingly prevalent. In a hydroponic garden no soil is used, instead a container is filled with a suitable material such as gravel and fluid such as water, and nutrients are periodically introduced to the gravel in the garden to make the plants in the garden grow. A hydroponic garden has certain advantages. It can be located in areas totally unsuitable for soil agriculture. Another advantage is that a hydroponic garden is free of weeds, and the amount of water required per acre is as little as 10 percent of that used in normal farming. Furthermore, no tractors, plows or farming tools are required, other than mechanical equipment such as pumps for feeding the nutrient solution to the garden. No crop rotation is required in hydroponic gardening since the same crop can be planted in the garden immediately after the harvesting of the previous crop. The nutrient solution and other farming methods can be standardized in a hydroponic garden so that good crops can be harvested with considerable predictability. The amount of labor required to farm a hydroponic garden is considerably less than that required in normal gardening. Even with all of the above advantages, the quality of the products obtained from a hydroponic garden are superior to the average crop grown in soil. The yield per acre can be larger in a hydroponic garden than in a normal garden since the crop planting is much closer in a hydroponic garden than in a normal garden.

In order for a hydroponic garden to produce an optimum yield of products per crop, the nutrient solution should be introduced to the hydroponic garden at controlled times, dependent upon the climate to which the hydroponic garden is subjected. After the nutrient solution has been introduced to the hydroponic garden, it should be drained immediately from the garden since the continued subjection of the roots of the plants to water is undesirable, particularly since the roots produce carbon dioxide which is prevented by the water from escaping. The ideal environment for plant growth would be to drain the nutrient solution as quickly as possible from the hydroponic garden after the nutrient solution has been introduced to the garden. By so doing, a vacuum effect would be produced which supplies new air around the plant roots. This new air has a relatively high content of oxygen and a low content of carbon dioxide. The replacement of the carbon dioxide by oxygen around the roots of the plant facilitates the growth of the plants.

Various attempts have been made in the past to provide a hydrophonic garden which will insure that all of the nutrient solution is removed from the hydroponic garden immediately after the hydroponic garden has been filled with the solution. Such attempts have also involved efforts to replace the nutrient solution in the hydroponic garden promptly with oxygen around the roots of the plants so that the growth of the plants will be stimulated. Such attempts have not been entirely successful. This has been particularly true when the hydroponic garden has involved large acres and the introduction of the nutrient solution to the garden and the removal of the nutrient solution from the garden has occurred through manual controls. Such attempts have also not been successful since the nutrient solution has not been drained from the garden at a rate more rapid than the introduction of the nutrient solution to the garden.

Present hydroponic gardens incorporate large growing beds constructed of permanent materials such as concrete, asphalt, etc. These beds require large amounts of gravel and require large holding tanks for the nutrient solution. Expansion and contraction of these large beds is also a source of cracked beds and associated piping. Large pumps are required to fill these beds with solution. Difficulty in returning the solution to the storage tank rapidly enough to induce oxygen to the roots of the plant has also prevailed. After a period of approximately 18 months, the root buildup from continuous planting retards plant growth and the beds must be completely cleaned of all gravel and sterilized at an excessive cost and delay in replanting.

This invention relates to a method of constructing a semi-permanent piping arrangement that is adaptable to unlevel as well as level surfaces. The mounting of removable containers upon said piping arrangement using a soft O-ring of suitable material as a seal and spacer, allowing the container to be irrigated from the bottom to a desired height, approximately 1 inch from the top of the gravel to eliminate possible plant disease encountered in surface irrigation methods. The containers are easily removed for cleaning and sterilizing allowing rapid replanting of the garden. By introducing a back flow to the piping arrangement, the nutrient solution can be rapidly drained from the containers introducing fresh air to the plant roots. A continuous supply of fresh air can be drawn into the containers if desired by maintaining a constant vacuum to the piping arrangement.

By the use of this method a 60 percent savings in gravel, nutrient chemicals, water, construction costs and maintenance costs will be realized over present hydroponic garden methods.

BRIEF DESCRIPTION

An object of the present inventin is the provision of the system and apparatus for hydroponic growing.

Another object of the invention is the provision of a system and apparatus for hydroponic growing with removable plant containers.

A further object of the invention is the provision of a system and apparatus for hydroponic growing in which leveling of the plumbing is not required.

A further object of the invention is the provision of a system and apparatus for hydroponic growing which maximizes area usage.

Yet another object of the invention is the provision of a system and apparatus for hydroponic growing which is inexpensive to install, requires a minimum of maintenance and is extremely convenient and efficient in use.

Other objects and many attendant advantages will be readily appreciated as the same becomes better understood by reference to the following detailed description when considered in connection with the accompanying drawings in which like reference numerals designate like parts throughout the FIGS. thereof and wherein:

FIG. 1 is a side elevation of one embodiment of the present invention;

FIG. 2 is a side elevation of a second embodiment of the present invention;

FIG. 3 is a side elevation of a third embodiment of the present invention;

FIG. 4 is a side elevation of a fourth embodiment of the present invention;

FIG. 5 is a side elevation of a fifth embodiment of the present invention;

FIG. 6 is a top view of a portion of the embodiments of FIGS. 1, 2, 3 and 4;

FIG. 7 is a top view of a portion of the embodiment of FIG. 5; and

FIG. 8 is a schematic illustration of a typical installation of the system of the present invention.

DETAILED DESCRIPTION OF THE DRAWING

Referring to FIG. 1, cylindrical container 11 rides an O-ring 12 which, in turn is carried by plastic sheet 13. Plastic sheet 13 is welded to plastic pipe 14 and runs the entire length of the pipe 14. Leveling blocks 15 maintain container 11 in an upright position. Pipe 14 is coupled at 16 to the area surrounded by O-ring 12.

Referring to FIG. 2, cylindrical container 11 is carried by O-ring 12 which, in turn, is carried by a polyfoam block 13a. Plastic pipe 14 is embedded in foam 13A and is aperture coupled at 16 to the area encircled by O-ring 12.

Referring to FIG. 3, cylindrical container 11 is carried by O-ring 12 which, in turn, is carried by flattened plastic pipe 14A. Plastic pipe 14A has an aperture 14 communicating with the area surrounded by O-ring 12.

Referring to FIG. 4, cylindrical container 11 is carried by O-ring 12 which rests on asphalt slab 13B. Plastic pipe 14 is embedded within asphalt slab 13B and has an aperture 16 communicating with the space surrounded by O-ring 12.

Referring to FIG. 5, a rectangular tub container 11A rests on O-rings 12. O-rings 12 rest on asphalt slab 13B. Plastic pipes 14 are embedded within asphalt slab 13B with apertures 16 communicating with the space defined by O-rings 16.

Referring to FIG. 6, container 11 is shown having a plurality of apertures 17 in the bottom thereof. O-ring 12 is shown in dotted lines.

Referring to FIG. 7, a plurality of plant locations are defined by aperture sections 17 in the bottom of tub container 11A. O-rings 12 are shown in dotted lines directly beneath the apertured sections 17.

Referring to FIG. 8, a plurality of Branch lines 14 are shown coupled to mainline 19. Mainline 19 is coupled at 21 to a pump 22 which communicates with tank 23. A plurality of cylindrical containers 11 are shown on two of the branch lines 14. Tub container 11A is shown resting on two other branch lines 14.

OPERATION

This invention provides for economical construction of a hydroponic garden with several adaptions. The first adaption is for use on level or unlevel terrain and is constructed by plastic welding of a sheet 13, of one-quarter inch thick by 12 inches wide, the entire length of a suitable size plastic pipe 14 of approximately 2 inches in diameter as indicated in FIG. 1. A ¾ inch hole is drilled through the ¼ inch plastic sheet 13 and the pipe at desired intervals and growing containers are placed over these holes using a suitable size O-ring as a seal and spacer, approximately ½ × 8 inches. These lengths of plastic pipe with the ¼ inch plastic sheet welded to it may be joined together to a desired length as shown in FIG. 8. These lengths of plastic pipe are capped on one end and connected to a suitable size, approximately 4 inch header pipe on the other end. A desired number of branches 14 of pipe may be connected to one main 19, as shown in FIG. 8. The main 19 is then connected to the nutrient storage tank 23 by a pump 22 to supply the nutrient solution to the piping system and growing containers. When the solution is drawn from the containers, fresh air, high in oxygen is introduced to the roots of the plants. A constant vacuum may be applied to the piping system to maintain a fresh air flow through the containers if desired. This adaption may be used on unlevel ground by leveling the piping structure by blocking under the plastic sheet 13 (FIG. 1).

Referring to FIG. 2, the second adaption is constructed by placing a suitable size plastic pipe 14, approximately 2 inches directly over a level surface such as earth, asphalt, concrete, etc. Forms are placed on both sides of the pipe, 6 inches from the center of the pipe and at a height so the top of the pipe is one-fourth inch lower than the top of the form. Two pound Polyfoam is then poured into the form completely encasing the pipe. After the foam is cured, it is leveled by the use of a taut piano wire drawn across the top of the forms. A ¾ inch hole 16 is then drilled at desired spacing and containers are placed over holes with the use of an O-ring as a seal and spacer. A header pipe and pump are employed as in adaption number one above.

Referring to FIG. 3, the third adaption is constructed by placing a suitable oval shaped or flattened plastic pipe 14A approximately 1½ × 9 inches on a level surface or on leveling blocks as indicated in FIG. 3. A ¾ inch hole 16 is drilled through the plastic pipe at desired intervals and growing containers are placed over these holes using a suitable size O-ring as a seal and spacer, approximately ½ inch × 8 inches. A header pipe and pump are employed as in adaption number 1 above.

Referring to FIGS. 4 and 5, the fourth adaption is to lay a 2 inch asphalt slab 13B on a level growing area of desired size. The asphalt is then saw cut and 2 inch wide strips removed at desired spacing. 2 inch plastic pipes 14 is then placed where the ashpalt was removed, so the top of the pipe is level with the surface of the slab. Pipe is then sealed in the slab with hot tar. ¾ inch holes 16 are drilled in the top of the pipe at desired spacing and the containers 11 or 11A are placed over the holes using an O-ring 13 as a seal and spacer. A header pipe and pump is employed as in the first adaption.

This invention incorporates two basic growing containers shown in FIGS. 6 and 7. The round container 11 shown in FIG. 6 is approximately 11 inches in diameter and 12 inches deep. The bottom of which is perforated with ⅛ inch holes 17 to cover the center of the pot to within 2 inches from the sides. Container 11 is designed for growing tomatoes, cucumbers and other plants suited to single container growing. FIG. 7 shows a square container 11A approximately 30 inches square and 6 inches deep. The bottom of this container is perforated with ⅛ inch holes 17 in four aras to take the place of four of the round containers. These containers are designed for growing small plants such as lettuce, radishes, strawberries, flowers, etc. Both containers shown in FIGS. 6 and 7 are constructed from a suitable material such as plastic. The perforated areas in both containers are designed to allow maximum nutrient flow through the gravel and at the same time prevent the gravel from entering the piping system.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A hydroponic growing system comprising:
   a main pipe line;
   a plurality of branch pipe lines connected to said main pipe line, said branch pipe lines having a plurality of spaced apart apertures on the top surfaces thereof and container support means extending peripherally therefrom;
   a plurality of containers having a bottom surface, each of said containers having at least one aperture in its bottom surface;
   said containers being positioned over said branch pipes lines so that apertures in said containers match with corresponding apertures in said branch pipe lines; and
   fluid-tight sealing means of compressible material positioned between the bottom surface of each of said containers and said support means, and surrounding the matched apertures of said containers and pipe lines.

2. The hydroponic growing system of claim 1 wherein said support means comprises:
   a plastic sheet welded to at least one of said branch lines on a top surface thereof, said plastic sheet having a plurality of spaced apertures disposed over said branch line pipe apertures; and
   said sealing means comprises a plurality of O-rings carried by said plastic sheet, each of said plurality of O-rings carrying one of said containers.

3. The hydroponic growing system of claim 1 wherein:
   said branch line pipes are embedded in a medium comprising said support means and having a plurality of spaced apertures disposed over said branch line apertures, said sealing means and said containers carried by said medium.

4. The hydroponic growing system of claim 1 wherein:
   said branch line pipes are embedded in polyfoam comprising said support means and having a plurality of spaced apertures disposed over said branch line apertures, said containers being carried by said polyfoam; and
   said sealing means comprises a plurality of O-rings.

5. The hydroponic growing system of claim 1 wherein:
   at least one branch line pipe is flattened and placed on a leveled surface, the pipe wall adjacent the aperture comprising the support means; and
   said sealing means comprises a plurality of O-rings.

* * * * *